US012802542B2

(12) United States Patent
Escofet Via et al.

(10) Patent No.: US 12,802,542 B2
(45) **Date of Patent: *Nov. 17, 2026**

(54) DETECTION SYSTEM WITH ADDRESSABLE UNITS

(71) Applicant: Kidde Fire Protection, LLC, Bradenton, FL (US)

(72) Inventors: Jordi Escofet Via, Barcelona (ES); Andres Cordoba Galera, Barcelona (ES); Ramon De La Torre Rodriguez, Barcelona (ES)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,220

(22) Filed: Oct. 8, 2024

(65) Prior Publication Data

US 2025/0029464 A1 Jan. 23, 2025

Related U.S. Application Data

(63) Continuation of application No. 18/151,083, filed on Jan. 6, 2023, now Pat. No. 12,170,009.

(30) Foreign Application Priority Data

Jan. 7, 2022 (EP) .................................... 22382005

(51) Int. Cl.
*G08B 17/06* (2006.01)
*G08B 25/00* (2006.01)
(Continued)

(52) U.S. Cl.
CPC ........... *G08B 17/06* (2013.01); *G08B 25/003* (2013.01); *G08B 25/04* (2013.01); *G08B 29/18* (2013.01)

(58) Field of Classification Search
CPC ...... G08B 17/06; G08B 25/003; G08B 29/18; G08B 25/04
See application file for complete search history.

(56) References Cited

U.S. PATENT DOCUMENTS 5,818,334 A 10/1998 Stanley
7,242,292 B2 7/2007 Berezowski et al.
(Continued)

FOREIGN PATENT DOCUMENTS

CN 204406597 U 6/2015
CN 109118697 A 1/2019
(Continued)

OTHER PUBLICATIONS

European Search Report for Application No. 22382005.1; Issued Jun. 15, 2022; 10 Pages.

*Primary Examiner* — John A Tweel, Jr.
(74) *Attorney, Agent, or Firm* — CANTOR COLBURN LLP

(57) ABSTRACT

A detection system (10) for hazard detection is provided. The detection system (10) includes a control loop (16); an addressable base unit (18) connected to the control loop (16), the base unit (18) including a first near-field communication module (22) storing a unit address; and a mounting unit (20) removably coupled to the base unit (18), the mounting unit (20) including a second near-field communication module (24) operable to read the unit address from the first near-field communication module (22) and store the unit address so that the mounting unit (20) is thereby addressable via the control loop (16).

15 Claims, 1 Drawing Sheet

(51) Int. Cl.

| | |
|---|---|
| ***G08B 25/04*** | (2006.01) |
| ***G08B 29/18*** | (2006.01) |

(56) References Cited

U.S. PATENT DOCUMENTS

| | | | | |
|---|---|---|---|---|
| 7,649,450 | B2 | 1/2010 | Campion et al. | |
| 7,710,256 | B2 | 5/2010 | Tawil | |
| 8,508,359 | B2 | 8/2013 | Piccolo | |
| 8,688,663 | B2 | 4/2014 | Ahlgren | |
| 9,184,801 | B2 | 11/2015 | Li et al. | |
| 9,331,746 | B2 | 5/2016 | Walsh et al. | |
| 10,291,292 | B2 | 5/2019 | Rumler et al. | |
| 10,679,491 | B1 | 6/2020 | Nalukurthy et al. | |
| 10,721,223 | B2 | 7/2020 | Jasper et al. | |
| 11,062,593 | B2 | 7/2021 | Oliver et al. | |
| 12,170,009 | B2 * | 12/2024 | Escofet Via | G08B 17/06 |
| 2013/0052946 | A1 | 2/2013 | Chatterjee et al. | |
| 2021/0183231 | A1 | 6/2021 | Arellano Valderrama | |

FOREIGN PATENT DOCUMENTS

| | | | |
|---|---|---|---|
| CN | 109479017 | B | 7/2021 |
| EP | 0362985 | A1 | 4/1990 |
| EP | 2234079 | A2 | 9/2010 |
| EP | 2597779 | A1 | 5/2013 |
| EP | 2936468 | A1 | 10/2015 |
| EP | 2988282 | A1 | 2/2016 |
| EP | 3076561 | A1 | 10/2016 |
| EP | 3319060 | A1 | 5/2018 |
| EP | 3667636 | A1 | 6/2020 |
| WO | 2004097762 | A1 | 11/2004 |
| WO | 2009058494 | A1 | 5/2009 |
| WO | 2020162954 | A1 | 8/2020 |
| WO | 2021028464 | A1 | 2/2021 |

* cited by examiner

DETECTION SYSTEM WITH ADDRESSABLE UNITS

CROSS-REFERENCE TO RELATED APPLICATIONS

This application is a continuation of U.S. patent application Ser. No. 18/151,083, filed Jan. 6, 2023, the entire contents of which are incorporated herein by reference, which claims priority to European Patent Application No. 22382005.1, filed Jan. 7, 2022, and all the benefits accruing therefrom under 35 U.S.C. § 119, the contents of which in its entirety are herein incorporated by reference.

TECHNICAL FIELD

The present disclosure relates to a detection system for hazard detection and a method of operating a detection system for hazard detection.

BACKGROUND

Detection systems are typically employed in structures, such as ship trailers, train carriages, or buildings, in order to identify hazards or hazardous conditions within the structure. For example, detection systems may be employed to detect fires or gas leaks within the structure. Typical detection systems employ a control panel and a number of units connected to the control panel on a loop. At least some of the units may be detector units. Other units may be alarm units. The units may be distributed throughout the structure in order to detect a hazardous condition. The units and control panel may communicate with one another by sending signals through the loop. These signals may be e.g. modulations in current and/or voltage in the loop. For example, the control panel may interrogate each unit in the loop to determine its state. The interrogation signals may be received by every unit in the loop; however, the control panel may only want to interrogate one unit at a time. As such, the control panel may encode an interrogation signal with a unit address of the unit it is to communicate with, thereby focussing communication to the unit with the corresponding unit address. The units may therefore need to store their unit address in order to determine if they are the unit that an interrogation signal is intended for. If the encoded address matches the unit address, then the unit may respond with the requested information. If the encoded address does not match the unit address, then the unit may ignore the interrogation signal.

Units within the detection system are typically composed of a base unit and a mounting unit coupled together, where the mounting unit may comprise the detecting and/or alarm capabilities of the unit. The base unit may be located in a fixed location in both the loop and the structure in which the system is installed. However, the mounting unit may be detachable from the base unit. As such, the mounting units within the detection system may be removed, replaced, and/or switched with one another. It is therefore important to ensure that the mounting unit is addressable.

In prior art systems, the unit address may be communicated to the mounting unit through an electrical contact with the base unit e.g. a metal-to-metal contact. Alternatively, the unit address may be input to the mounting unit manually by a user positioning a mechanical switch (or a series of mechanical switches) on the mounting unit. However, both of these solutions are time-consuming and complex. In addition, electrical contacts between units may wear over time (e.g. due to friction), may be subject to corrosion (e.g. in environments near the sea, or with high humidity), may be disrupted by movement of the structure, may spark, and so on. In environments with flammable or volatile surroundings, this can be disastrous.

There is therefore a need for a simpler and more reliable method of operating a mounting unit of a detection system.

SUMMARY OF THE INVENTION

According to a first aspect of the invention, a detection system for hazard detection is provided. The detection system comprises a control loop; an addressable base unit connected to the control loop, the base unit comprising a first near-field communication (NFC) module storing a unit address; and a mounting unit removably coupled to the base unit, the mounting unit comprising a second near-field communication (NFC) module operable to read the unit address from the first near-field communication (NFC) module and store the unit address so that the mounting unit is thereby addressable via the control loop.

In use, the detection system may comprise a plurality of units connected to the control loop (e.g. a plurality of base units and/or a plurality of mounting units), and a communication may be sent through the control loop (e.g. by a control panel) that is intended for a specific unit connected the control loop. This communication signal may be encoded with an address of the single unit that it is intended for. A given unit may therefore need to store its unit address in order to determine if it is the unit that a received communication signal is intended for, and hence to determine whether or not to respond. The unit address may be unique to the respective unit. Whilst the base unit may remain in a fixed position in the control loop (e.g. because it is hard-wired to the control loop), the mounting unit attached to the base unit may be interchanged, replaced, and/or removed. As such, the unit address of the mounting unit may be changed, depending on which base unit it is attached to, by using the NFC modules in both the base unit and the mounting unit in order to wirelessly communicate the unit address to the mounting unit. Thus, the system allows the mounting unit to be simply and reliably allocated its unit address within the system by connection to the base unit.

The detection system may be a fire detection system. The mounting unit may comprise a detector module, which may be a module for sensing conditions and/or for receiving inputs from users. For example, the detector module may be configured to detect a condition upon which an alarm should be raised. The detector module may include one or more of: manual call points, smoke detectors, heat detectors, carbon monoxide detectors, nitrogen oxide detectors, room thermostats, supervised door sensors, supervised fire extinguishers, and so on.

The mounting unit may comprise inputs such as a button or sensor for triggering an alarm condition of the detection system. The mounting unit may comprise an alarm module, which may be a module for indicating an alarm condition of the detection system. The alarm module may be configured to broadcast a warning (i.e. an alarm) via the control loop. The mounting unit may comprise audible or visual devices, for example. The mounting unit may include one or more of: a siren, a bell, a speech sounder, a light, a beacon, and so on. The mounting unit may comprise a transmitter device for sending alarm notifications to users. Alarm notifications may be sent to local users, for example via wireless transmission of notifications to a mobile device, and/or may be sent to remote users such as building management authorities and/ or emergency services. The mounting unit may comprise a combined detector and alarm module, which may include combinations of any of the functions discussed above in relation to the detector and alarm modules.

The invention may extend to a building, structure, vehicle, ship, train, trailer, or container incorporating the detection system, wherein the base unit and mounting unit may be distributed therein.

The control loop may be a closed-loop connection pathway through which communication signals may be sent e.g. interrogation signals sent by a control panel of the system. The communication signals may be any suitable signal and may be in the form of current pulses and/or voltage pulses, for example, and the control loop may be a loop of conductive material such as wire. The control loop may therefore be a tangible loop of conductive material. The control loop may be configured to allow communication between units connected on the control loop. For example, a control panel may be connected to the control loop, and the control panel may be configured to transmit communication signals through the control loop. The communication signals may travel through the entire length of the control loop, and thus may be received by each unit connected to the control loop. In this way, it can be ensured that each unit connected to the control loop is connected to one another.

Whilst some communications may be intended for all of the units connected to the control loop, others may be intended for a particular unit connected to the control loop. The units may therefore be distinguished from one another by the unit address, which may be a unique identifier for that unit within the control loop. The unit address may correspond to the position of the unit within the control loop, and/or may uniquely identify the unit within the system. Any communication signals intended for a particular unit may therefore be encoded with the unit address of that unit. For example, a control panel may encode any communication signals it transmits with the unit address of the unit it intends to communicate with. When a communication signal passes through the control loop, it may be received by each unit connected to the control loop. Each of these units may determine if the communication signal is intended for them based on the unit address encoded in the communication. If the unit address encoded in the communication signal matches the unit address of the unit, then the unit may respond to the communication signal. If the unit address encoded in the communication signal does not match the unit address of the unit, then the unit may ignore the communication signal. It is therefore important that the base unit and the mounting unit have the correct unit address within the system. The control panel may therefore be operable to communicate with the base unit and/or mounting unit via the control loop using the unit address stored in the base unit and/or mounting unit.

The addressable base unit may be configured to transmit and/or receive communication signals within the control loop. The addressable base unit may be fixedly connected to the control loop, for example through a wired connection (e.g. comprising physical, tangible wiring). The addressable base unit may be hard-wired to the control loop. The addressable base unit may be in a fixed position relative to the control loop. The unit address may be an address of the base unit within the control loop. The detection system may be configured to be installed within a building or structure, and the addressable base unit may be configured to be installed in a fixed position within that building or structure. The addressable unit may be fixedly connected to a surface such as a ceiling in the building, for example through cabling. The base unit may comprise fixings for attaching the base unit to a surface.

The mounting unit may be detachable from the base unit in such a way that the mounting unit can be detached from the base unit without causing damage to the base unit and/or the mounting unit. In particular, the mounting unit may be detachable from the base unit in such a way that does not damage the internal components of either unit. For example, the mounting unit may be mechanically fastened to the base unit by any suitable means, such as through screws, bolts, a mating arrangement, threaded portions, a slot-and-key arrangement, a bayonet coupling, interlocking portions and so on. For example, the mounting unit may comprise a mounting unit housing comprising a threaded portion, and the threaded portion of the mounting unit housing may be configured to engage with a threaded portion of the base unit. The mounting unit may comprise a mating portion arranged to reversibly mate with a corresponding mating portion of the base unit. The attachment of the mounting unit to the base unit may therefore be considered to be reversible.

The base unit may be configured to wirelessly communicate the unit address to the mounting unit using the first NFC module. The mounting unit may be configured to wirelessly receive the unit address from the base unit using the second NFC module. The first NFC module may comprise a first antenna. The second NFC module may comprise a second antenna. The first NFC module and the second NFC module may be configured to transmit signals to one another using the first antenna and the second antenna, respectively. The first antenna of the first NFC module may be coupled to a first transmitter of the first NFC module and/or a first receiver of the first NFC module. The second antenna of the second NFC module may be coupled to a second transmitter of the second NFC module and/or a second receiver of the second NFC module. The first antenna and/or the second antenna may be any suitable antenna, such as a coil antenna. The first NFC module and the second NFC module may comprise a first memory and a second memory, respectively, for storing the unit address. The first memory and/or the second memory may be configured to store an amount of data suitable for their use in the system e.g. up to 1 kilobyte of data. The second NFC module may be configured to interrogate the first NFC module for the unit address. The first NFC module may be configured to transmit the unit address to the second NFC module in response to the interrogation from the second NFC module. Alternatively, the first NFC module may be configured to test for the presence of the second NFC module. The first NFC module may interrogate the second NFC module to determine its unit address (if any), and then write the necessary unit address of the base unit to the second NFC module if the unit address does not match that of the base unit. The second NFC module may be configured to store the unit address in the second memory. In this way, the mounting unit may determine and store its unit address.

The mounting unit may be configured to transmit communication signals to and/or receive communication signals from the control loop via the base unit. The mounting unit may comprise a processor for processing the signals received from the base unit. The processor may include a decoder for decoding the received signals. For example, the decoder may be configured to decode the unit address encoded in the received signal. The mounting unit may be configured to compare the decoded unit address from the received signal with the unit address stored in the second NFC module, for example using the processor. The mounting unit may be configured to respond to the signal only if the decoded unit address matches the stored unit address.

The first NFC module may be removably attached to rest of the base unit. In other words, the first NFC module may be replaceable. That is, the first NFC module may be detachable from the base unit in such a way that its removal will not damage the other components of the base unit. For example, the first NFC module may be attached to the base unit by adhesive e.g. to an exterior surface of the base unit. The adhesive may be a peelable and/or removable adhesive. The adhesive may be any suitable adhesive for reliably fixing the first NFC module. For example, the adhesive may comprise water-based acrylic. This may provide a simple, reliable, and low cost solution for attaching the first NFC module to the base unit. Additionally or alternatively, the first NFC module may be removably inserted into a receiving portion of the base unit. For example, the first NFC module may be embodied on a card, tab, tag or the like, and the receiving portion may be configured to receive and retain the first NFC module for use. The receiving portion of the base unit may be a portion of the base unit that is shaped to receive the first NFC module e.g. a socket or a slot. The receiving portion of the base unit may comprise a shape and a volume that corresponds to a shape and a volume of the first NFC module. The first NFC module may be in a tight fit relationship with the receiving portion of the base unit e.g. a friction fit. The receiving portion may comprise a removable cover. The removable cover may be configured such that it may be removed during insertion of the first NFC module into the receiving portion, and may be re-attached once the first NFC module has been inserted into the receiving portion. The removable cover may be any suitable cover, such as a lid, cap, and/or flap. This may allow the first NFC module to be simply attached to a secure location within the base unit. Further, the replaceability of the first NFC module may provide a simple solution for upgrading the existing infrastructure of the base unit.

Thus, the first NFC module storing the unit address may be simply installed within the base unit, analogously to a SIM (subscriber identification module) card installed in a mobile telephone. The system may therefore be simply assembled, and a plurality of unit addresses simply assigned to respective base units (and subsequently mounting units). The first NFC module may be removable from the base unit without the use of any tools and without damage to either the first NFC module or the base unit. Another NFC module (for example storing another unit address) may then be installed in the base unit e.g. to thereby change the unit address of the base unit (and subsequently the mounting unit).

The base unit may comprise a base unit housing. The first NFC module may be attached to the base unit housing. The first NFC module may be attached to an outer and/or external surface of the base unit housing. All other components of the base unit may be internal to the base unit housing. The first NFC module may be connected to the base unit housing using adhesive, as described previously. In this way, the first NFC module may be easily accessible to a user, as the first NFC module can be accessed without dismantling any other parts of the base unit. The base unit housing may comprise a receiving portion, such as a slot or socket, arranged to receive and retain the first NFC module so that the first NFC module is installable into the base unit and useable thereby as described herein.

The second NFC module may be attachable or installable to the mounting unit in a similar way to the first NFC module being attachable or installable to the base unit. Alternatively, the second NFC module may be integral to the mounting unit. The second NFC module may be installed in the mounting unit during manufacture of the mounting unit. The mounting unit may comprise a mounting unit housing. The second NFC module may be housed within the mounting unit housing.

The first NFC module may store information other than the unit address. For example, the first NFC module may store information regarding the location of the base unit within a building or structure. Additionally or alternatively, the first NFC module may store configuration instructions for configuring the mounting unit for use. The configuration instructions may include instructions regarding what parameters the mounting unit should detect, such as nitrogen oxides, carbon monoxide, smoke, and/or heat. The second NFC module may be configured to interrogate the first NFC module for the information stored on the first NFC module. The first NFC module may be configured to transmit the requested information to the second NFC module. The second NFC module may be configured to store the information received from the first NFC module. The second NFC module may comprise a processor, and the processor may execute the configuration instructions received from the first NFC module. In this way, the mounting unit may be configured using information from the first NFC module.

The second NFC module may be configured to write to the first NFC module. For example, the second NFC module may be configured to write to the first NFC module with a (new) unit address, configuration information, unit health information, profile information, alarm information, sensor data and/or disablement information. The alarm information may include an alarm signal and optionally an alarm warning level indicating the severity of the alarm. The second NFC module may be configured to write to the first NFC module with alarm information and/or sensor data on a periodic basis, such as once every second, once every ten seconds, once every thirty seconds, and so on. Additionally or alternatively, the second NFC module may be configured to write to the first NFC module with alarm information when an emergency condition is detected (e.g. a condition upon which an alarm should be raised). The first NFC module may be configured to store the information received from the second NFC module and/or transmit the information received from the second NFC module through the control loop, e.g. to a control panel.

The first NFC module may be configured to interrogate the second NFC module for information, such as alarm information and/or sensor data. The alarm information may include an alarm signal, and optionally a warning level for the alarm. The base unit may be configured to pass an interrogating signal from the control loop to the mounting unit via the first NFC module and the second NFC module, to thereby render the mounting unit addressable by e.g. a control panel.

The detection system may comprise a mobile device, the mobile device comprising a third NFC module operable to write to the second NFC module and thereby configure the mounting unit for use. The third NFC module may be configured to store configuration instructions for the mounting unit and may be configured to write to the second NFC module with the configuration instructions. The third NFC module may be configured to read information stored on the second NFC module, such as sensor information, profile information, configuration information, and/or alarm information. The third NFC module may be configured to read the unit address from the second NFC module. The third NFC module may be configured to read information from the first NFC module and/or may be configured to write information to the first NFC module. For example, the third NFC module may be configured to write to the first NFC module with the unit address and/or configuration instructions. The configuration instructions may be for the base unit and/or the mounting unit. The mobile device may be a personal mobile device, such as a smartphone or tablet. The mobile device may be operable to read and/or update the unit address of the base unit and/or the mounting unit while the mounting unit is mounted to the base unit. The system may enable configuration of the base unit and/or the mounting unit while the mounting unit is mounted to the base unit, for example through the mobile device.

The first NFC module and/or the second NFC module (and/or the third NFC module, where provided) may therefore be configured to use a near-field communication (NFC) communication protocol to communicate with other NFC modules. The NFC modules may be standardised in ISO/IEC 18092/ECMA-340. The air interface for the NFC modules may be standardised in ISO/IEC 18092/ECMA-340 and/or ISO/IEC 21481/ECMA-352. The first NFC module, the second NFC module, and/or the third NFC module may be configured to operate at a standardised frequency e.g. of 13.6 MHz (megahertz). The first NFC module, the second NFC module, and/or the third NFC module may be configured to wirelessly communicate with each other over short-range distances, such as distances up to 10 cm (centimetres). The first NFC module may be within 10 cm of the second NFC module when the mounting unit is attached to the base unit, and may preferably be within 4 cm.

The first NFC module may be a passive NFC module, and/or may be considered to be an NFC tag. A passive NFC module may be an NFC module that is not connected to a power source. A passive NFC module may be an NFC module that is configured to send data only (i.e. an NFC module that is not configured to read data). The second NFC module may be an active NFC module, and/or may be considered to be an NFC reader. An active NFC module may be an NFC module that is connected to a power source. An active NFC module may be an NFC module that is configured to both send and receive data. The third NFC module may be an active NFC module or a passive NFC module. The third NFC module may be part of a mobile device such as a smartphone, tablet computer, laptop, diagnostic tool or the like, and may therefore be an active NFC module operable to read from and write to other NFC modules. The second NFC module may comprise a power supply. The second NFC module may be configured to create a magnetic carrier field, and may be configured to communicate information by modulating the carrier field. The second NFC module may be configured to create the magnetic carrier field using the power supply. The first NFC module may be configured to communicate information by modulating the carrier field generated by the second NFC module. The first NFC module may be configured to draw its operating power from the carrier field generated by the second NFC module. The processor of the first NFC module and/or the processor of the second NFC module may be configured to decode and/or process the modulations in the carrier field.

The first NFC module and the second NFC module may both be active NFC modules. In this case, the first NFC module may generate a first magnetic field and the second NFC module may generate a second magnetic field. The first NFC module and the second NFC module may be configured to communicate with one another by alternately generating their magnetic fields.

The first NFC module, the second NFC module, and/or the third NFC module may be configured to use a Miller coding with 100% modulation to modulate the carrier field. Additionally or alternatively, the first NFC module, the second NFC module, and/or the third NFC module may be configured to use a Manchester coding with a modulation ratio of 10% to modulate the carrier field.

The second NFC module and/or the third NFC module may be configured to use an additional communication protocol to communicate with other wireless modules, such as a Bluetooth Low Energy (BLE) communication protocol. The second NFC module may be configured to communicate with the third NFC module using the additional communication protocol. In this way, communication between the mobile device and mounting unit may not be limited to short distances only. For example, the second NFC module may be configured to communicate with the third NFC module using a BLE communication protocol, e.g. at a standardized frequency such as 2.4 GHz (gigahertz). The mounting unit may therefore be configured to communicate with the mobile device over relatively large distances, such as distances up to 10 m (metres), 20 m, 50 m or 100 m. The second NFC module and/or the third NFC module may be configured to use BLE communications in addition to NFC communications.

The detection system may comprise a plurality of additional NFC modules each storing a different unit address. The base unit and the mounting unit may not comprise the plurality of additional NFC modules. The plurality of additional NFC modules may be unattached to the base unit and the mounting unit, and may be unattached to any other base unit or mounting unit in the system. The plurality of additional NFC modules may not be attached to anything. The plurality of additional NFC modules may comprise removable adhesive and may be removably attachable to the base unit and/or the mounting unit. Additionally or alternatively, the plurality of additional NFC modules may be removably insertable into a receiving portion of the base unit and/or the mounting unit, for example analogously to a mobile telephone SIM card being installable into a mobile telephone. The plurality of additional NFC modules may be passive NFC modules storing the unit address. The plurality of additional NFC modules may be manufactured using a perforated sheet containing all of the unit addresses of the control loop. The plurality of additional NFC modules may store all of the unit addresses of the control loop. The perforated sheet may therefore comprise an NFC module for each unit address. A unit address may be stored on each NFC module in the perforated sheet using a writer device, for example using the mobile device. As such, the unit addresses may be stored on the plurality of NFC modules during manufacture of the NFC modules. In this way, the unit address may be simply assigned to a unit connected to the control loop by attaching or installing an NFC module storing that unit address to the unit. That is, the assignment of a unit address to a unit may not require any tools, as the unit address is pre-loaded on the NFC module. Since NFC modules (and particularly passive NFC tags) are cheap and readily available, the perforated sheet may contain a passive NFC tag for each address, and a user can provide a system (or update an existing system) by selecting an NFC tag, tearing it from the perforated sheet, and attaching it to or installing it in the base unit.

Near-field communication modules have a greater functionality than e.g. simpler RFID tags and the like, and therefore may be used not only to transmit information between the base unit and the mounting unit, but also to transmit power between the (hard-wired) base unit and the detachable mounting unit. Thus, the mounting unit may be configured to be powered wirelessly via the second NFC module and the first NFC module of the base unit. For example, at least one of a processor, a memory, a transmitter, a receiver, an audible indicator, a visual indicator, and/or a sensor of the mounting unit may be configured to be powered wirelessly via the second NFC module and the first NFC module of the base unit. The audible indicator of the mounting unit may be, for example, a siren and/or a buzzer for indicating an alarm condition e.g. in the event of a fire or other event. The visual indicator of the mounting unit may be, for example, an LED and/or a display screen for indicating a condition of the base unit, mounting unit, and/or detection system. The first NFC module may be configured to wirelessly supply power to the second NFC module. The second NFC module may be configured to supply power to the remaining components of the mounting unit, such as the processor, the memory, the transmitter, the receiver, the audible indicator, the visual indicator, and/or the sensor of the mounting unit. The base unit may be configured to receive power from the control loop. The base unit may be configured to provide power from the control loop to the mounting unit via the first NFC module and the second NFC module. The mounting unit may be configured to receive all of its power from the base unit via the first NFC module and the second NFC module. Thus, all components of the mounting unit may receive power via the second NFC module. In this way, the base unit may not require any wired or electrical connections to the mounting unit e.g. tangible, hard-wired connections, or physical contacts. The mounting unit may not comprise any tangible means for receiving power, such as cabling, wiring, and/or electrical contacts.

Typically, conventional base units may comprise electrical contacts for providing power to conventional mounting units. As this requires physical contact between electrical contacts of the base unit and corresponding contacts of the mounting unit, the electrical contacts may be worn and damaged over time due to friction between the units and/or a harsh environment (e.g. an environment subject to high levels of corrosion, such as an environment near the sea, an environment with high humidity, and so on). This may be especially the case in transport environments, such as trains, ships, containers, and/or trailers. By using the NFC modules to supply power to the mounting unit, the need for electrical contacts is eliminated, and thus the wear and damage associated with such electrical contacts is avoided and a failure point of the system can thereby be eliminated. The base unit of the first aspect may therefore not comprise electrical terminals for contact with the mounting unit. The mounting unit of the first aspect may not comprise electrical terminals for contact with the base unit. Thus, both of the base unit and the mounting unit may be provided without exposed electrical contacts, and instead all electrical communication between the units may be only via the first NFC module and the second NFC module. The mounting unit may communicate (e.g. for power and data) with the base unit only through the second NFC module and the first NFC module.

At least some of the components of the base unit may be physically isolated and/or shielded from the surrounding environment. From herein, the components of the base unit that are physically isolated and/or shielded from the surrounding environment may be known as the shielded components of the base unit. The shielded components of the base unit may not be exposed to the outer environment. The shielded components of the base unit may comprise all components of the base unit, or may comprise all components of the base unit except the first NFC module. As mentioned previously, the base unit may comprise a base unit housing. The base unit housing may house all of the shielded components of the base unit. That is, the shielded components of the base unit may be located internally to the base unit housing. The base unit housing may physically isolate and/or shield the shielded components of the base unit from the surrounding environment. The base unit housing may seal the shielded components of the base unit within its interior. Put simply, the base unit housing may constitute a protective casing for all of the components of the base unit. In this way, it can be ensured that no electric connections or electrical contacts are exposed to the surrounding environment and e.g. degraded thereby.

At least some of the components of the mounting unit may be physically isolated and/or shielded from the surrounding environment. From herein, the components of the mounting unit that are physically isolated and/or shielded from the surrounding environment may be known as the shielded components of the mounting unit. The shielded components of the mounting unit may not be exposed to the outer environment. The shielded components of the mounting unit may comprise all components of the mounting unit, or may comprise all components of the mounting unit except the second NFC module. The shielded components of the mounting unit may include one or more of the processor, the memory, the transmitter, the receiver, the audible indicator, the visual indicator, or the sensor of the mounting unit. As mentioned previously, the mounting unit may comprise a mounting unit housing. The mounting unit housing may house all of the shielded components of the mounting unit. That is, the shielded components of the mounting unit may be located internally to the mounting unit housing. The mounting unit housing may physically isolate and/or shield the shielded components of the mounting unit from the surrounding environment. The mounting unit housing may seal the shielded components of the mounting unit within its interior. Put simply, the mounting unit housing may constitute a protective casing for all of the components of the mounting unit.

The shielded components of the base unit may therefore be physically isolated from the shielded components of the mounting unit. That is, the shielded components of the base unit may not be physically and/or electrically connected to the shielded components of the mounting unit. In this way, it can be ensured that no electric connections or electrical contacts of the base unit and/or the mounting unit are exposed to the surrounding environment. This can be especially beneficial in hazardous and/or unstable environments, such as those containing flammable cargo and/or those with high humidity or corrosive potential.

The above concept is considered inventive in itself, and so according to a second aspect of the invention there is provided a detection system for hazard detection, the detection system comprising: a control loop; an addressable base unit connected to the control loop, the base unit comprising a first NFC module storing a unit address; and a mounting unit removably coupled to the base unit, the mounting unit comprising a second NFC module and configured to be powered wirelessly via the first NFC module of the base unit and the second NFC module.

Particularly, at least one of a processor, a memory, a transmitter, a receiver, an audible indicator, a visual indicator, and/or a sensor of the mounting unit may be configured to be powered wirelessly via the second NFC module and the first NFC module of the base unit. The audible indicator of the mounting unit may be, for example, a siren and/or a buzzer. The visual indicator of the mounting unit may be, for example, an LED and/or a display screen. The first NFC module may be configured to wirelessly supply power to the second NFC module. The second NFC module may be configured to supply power to the remaining components of the mounting unit, such as the processor, the memory, the transmitter, the receiver, the audible indicator, the visual indicator, and/or the sensor of the mounting unit. The base unit may be configured to receive power from the control loop. The base unit may be configured to provide power from the control loop to the mounting unit via the first NFC module and the second NFC module. The mounting unit may be configured to receive all of its power from the base unit via the first NFC module and the second NFC module. In this way, the base unit may not require any wired or electrical connections to the mounting unit. The mounting unit may not comprise any physical means for receiving power, such as cabling, wires, and/or electrical contacts. Typically, base units may comprise electrical contacts for providing power to mounting units. As this requires physical contact between the electrical contacts of the base unit and those of the mounting unit, the electrical contacts may be worn and damaged over time due to friction between the units or a harsh environment (e.g. an environment subject to high levels of corrosion, such as an environment near the sea, or an environment with high humidity). This may be especially the case in transport environments, such as trains, ships, container, and/or trailers. By using the NFC modules to supply power to the mounting unit, the need for electrical contacts is eliminated, and thus the wear and damage associated with such electrical contacts is avoided as described above with reference to the first aspect of the invention. The base unit of the second aspect may therefore not comprise electrical terminals for contact with the mounting unit. The mounting unit of the second aspect may not comprise electrical terminals for contact with the base unit.

The second NFC module may be operable to read the unit address from the first NFC module and store the unit address so that the mounting unit is thereby addressable via the control loop.

The system of the second aspect may comprise the features recited herein with reference to the first aspect.

The system of the first aspect or the second aspect may comprise a control panel. The control panel may be connected to the control loop. The control loop may comprise wiring starting and finishing at the control panel. The system may comprise a plurality of units connected to the control loop, each with a different unit address. At least some of these units may comprise a base unit and a mounting unit as described herein, and the system may therefore comprise a plurality of base units and mounting units as described herein. The control panel may be configured to monitor alarm conditions and possible emergencies based on signals received from units on the control loop. The control panel may be configured to trigger an alarm condition in at least some of the units connected to the control loop in response to an indication of a possible emergency. The control panel may be configured to transmit communication signals through the control loop in the form of voltage pulses and/or current pulses. The control panel may be configured to monitor the voltage and/or current in the control loop in order to detect any signals from units connected to the control loop. The control panel may be configured to monitor faults in the circuit, such as short circuits and/or line breaks.

The control panel may be configured to transmit interrogation signals through the control loop. The control panel may be configured to encode the interrogation signals with one or more unit addresses. The control panel may be configured to store the unit address of each unit connected to the control panel, for example in a memory. The control panel may be configured to periodically transmit an interrogation signal to each unit on the control loop, for example every second, every 10 seconds, every 30 seconds, or at any suitable regular interval. The interrogation signal may include a request for information from the mounting unit, and the information may include one or more of: alarm information; unit health information; configuration information; and sensor data. The alarm information may include an alarm signal and/or a warning level for the alarm. The control panel may therefore be configured to address the mounting unit. The control panel may be configured to process any received information, and may be configured to determine a response to the information. For example, the control panel may be configured to determine that all or some of the units on the control loop should enter an alarm condition. The control panel may be configured to determine that only the units in the same zone as the emergency should enter an alarm condition, and/or that some units should enter an alarm condition at different times than others. This may aid efficient evacuation of the building in the event of an emergency.

The base unit may be configured to receive interrogation signals from the control panel and transmit the interrogation signals to the mounting unit. The first NFC module may be configured to transmit the interrogation signals to the second NFC module. The mounting unit may be configured to decode the interrogation signal. In this way, the mounting unit may be configured to determine if it is the unit that the interrogation signal is intended for. If this is the case, the mounting unit may transmit a response to the interrogation signal to the base unit. The second NFC module may transmit the response to the first NFC module. The base unit may then transmit the response through the control loop to the control panel. The mounting unit may be configured not to respond if the interrogation signal is not addressed to it.

The mounting unit may detect an alarm condition and may transmit an alarm signal to the base unit. The second NFC module may transmit the alarm signal to the first NFC module. The base unit may transmit the alarm signal through the control loop to the control panel.

The control panel may transmit an alarm triggering signal through the control loop. The alarm triggering signal may be encoded with one or more unit addresses. The base unit may be configured to transmit the alarm triggering signal to the mounting unit through the first NFC module and the second NFC module. The mounting unit may be configured to decode the alarm triggering signal, and, if the alarm triggering signal contains its unit address, may be configured to enter an alarm state in response to the alarm triggering signal. The mounting unit may be configured not to enter an alarm state if the alarm triggering signal is not addressed to it.

According to a third aspect of the invention, a method of operating a detection system for hazard detection is provided. The system comprises: a control loop; an addressable base unit connected to the control loop, the base unit comprising a first NFC module storing a unit address; and a mounting unit removably coupled to the base unit, the mounting unit comprising a second NFC module. The method comprises: reading the unit address from the first NFC module using the second NFC module; and storing the unit address in the mounting unit so that the mounting unit is thereby addressable via the control loop.

The method may include coupling the mounting unit to the base unit comprising the first NFC module. The method may comprise selecting the first NFC module from a plurality of available NFC modules, each of the plurality of available NFC modules having stored therein a respective unit address.

The method may include removeably attaching or installing the first NFC module to the base unit. For example, the method may include attaching the first NFC module to the base unit using an adhesive, such as a removable and/or peelable adhesive. The method may include using adhesive to attach the first NFC module to an exterior and/or outer surface of the base unit, in particular to an exterior and/or outer surface of a base unit housing. Additionally or alternatively, the method may include inserting the first NFC module into a receiving portion of the base unit e.g. removably installing the first NFC module like a SIM card in a mobile telephone. The method may include housing all the other components of the base unit within the base unit housing. Alternatively, the method may include housing all of the components of the base unit, including the first NFC module, within the base unit housing.

The method may comprise using a mobile device comprising a third NFC module to read the unit address from the mounting unit and/or the base unit. The method may comprise using the third NFC module to write information to the first NFC module and/or the second NFC module. The information may include configuration information, for example. The method may include configuring the mounting unit and/or the base unit based on information written on the first NFC module and/or the second NFC module by the third NFC module. Thus, it may be possible to configure the mounting unit and/or the base unit without dismantling either unit. The method may include interrogating the base unit and/or the mounting unit using the third NFC module. The method may include reading the unit address from the base unit and/or the mounting unit using the mobile device while the mounting unit is coupled to the base unit.

The method may include writing to a plurality of NFC modules using the mobile device. The method may include writing to the plurality of NFC modules with configuration instructions. The method may include writing to a plurality of NFC modules remotely from the detection system, for example in a warehouse or factory. The method may include perforating a sheet of NFC modules with each unit address of the control loop. The method may include removably adhering or installing each NFC module of the plurality of NFC modules to a unit within the control loop, for example the base unit.

The mounting unit may be a first mounting unit and the system may comprise a second mounting unit comprising an NFC module. The method may include de-coupling the first mounting unit from the base unit and coupling the second mounting unit to the base unit. The method may include reading the unit address of the base unit using the NFC module of the second mounting unit, and storing the unit address in the second mounting unit such that the second mounting unit is thereby addressable via the loop. In this way, it may be possible to remove and replace a mounting unit in a simple and efficient manner.

The base unit may be a first base unit and the system may comprise a second base unit comprising an NFC module. The method may include de-coupling the mounting unit from the first base unit and coupling the mounting unit to the second base unit. The method may include reading the unit address of the NFC module of the second base unit, and storing the unit address of the NFC module of the second base unit in the mounting unit. The method may include overriding the unit address of the first base unit with the unit address of the second base unit. In this way, it may be possible to move a mounting unit around the control loop in a simple and efficient manner.

The method may include powering the mounting unit wirelessly via the first NFC module and the second NFC module. The method may include wirelessly powering at least one of a processor, a memory, a transmitter, a receiver, an audible indicator, a visual indicator, and/or a sensor of the mounting unit via the first NFC module and the second NFC module. The method may include supplying power to the base unit through the control loop. The method may include providing power from the base unit to the mounting unit through the first NFC module and the second NFC module. The method may include entirely powering the mounting unit wirelessly via the first NFC module and the second NFC module. That is, the method may include receiving power at the mounting unit only through the first NFC module and the second NFC module.

The above concept is considered inventive in its own right, and therefore according to a fourth aspect of the invention, there is provided a method of operating a detection system for hazard detection. The system comprises: a control loop; an addressable base unit connected to the control loop, the base unit comprising a first NFC module storing a unit address; and a mounting unit removably coupled to the base unit, the mounting unit comprising a second NFC module. The method comprises powering the mounting unit wirelessly via the first NFC module and the second NFC module.

The method may include reading the unit address from the first NFC module using the second NFC module; and storing the unit address in the mounting unit so that the mounting unit is thereby addressable via the control loop. The method may comprise any of the features described herein with reference to any aspect of the invention. The method of the fourth aspect of the invention may include any of the features described herein with reference to the third aspect of the invention.

The method of the third and fourth aspects of the invention may be carried out using any of the features described herein with reference to the first and second aspects of the invention. The method of the third aspect of the invention and/or the method of the fourth aspect of the invention may comprise providing and/or using the system as recited herein with reference to the first aspect of the invention and/or the second aspect of the invention. The first aspect of the invention and/or the second aspect of the invention may be configured to perform the method of the third aspect of the invention and/or the method of the fourth aspect of the invention.

BRIEF DESCRIPTION OF THE DRAWINGS

Certain embodiments of the disclosure will now be described by way of example only and with reference to the accompanying drawings in which.

DETAILED DESCRIPTION

Figure 1:
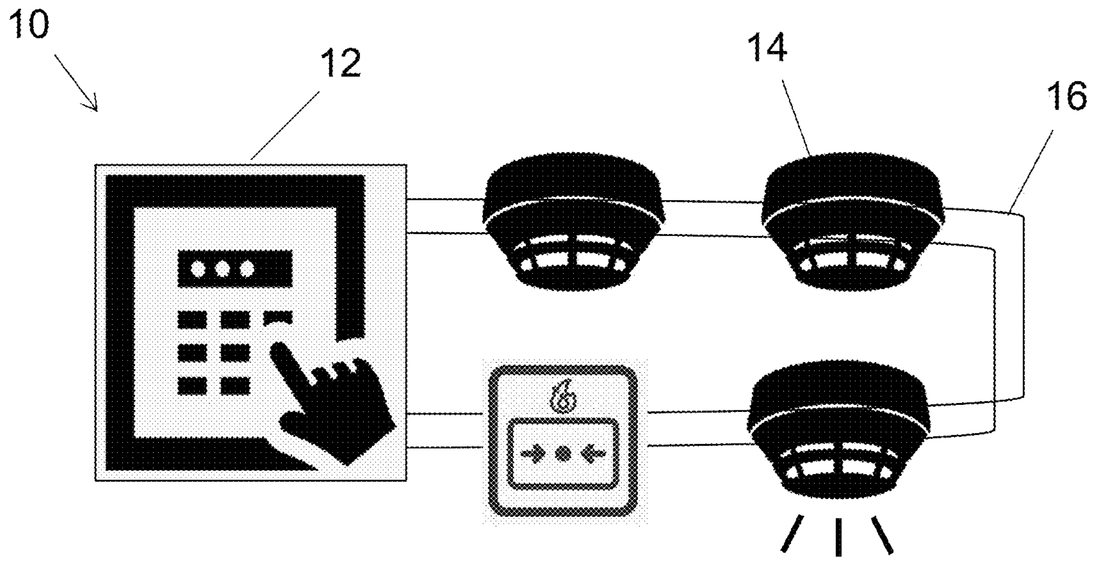
FIG. 1 is a schematic diagram of a detection system.

FIG. 1 shows a schematic diagram of a detection system 10. The detection system 10 comprises a control panel 12 connected to a plurality of units 14 via a control loop 16. As can be seen from FIG. 1, the control loop 16 may be a closed loop starting and ending at the control panel 12. The control loop 16 may be a wire, and the units 14 and control panel 12 may be hard-wired to the control loop 16. The detection system 10 may be a fire detection system, and the control panel 12 may be a fire control panel. The units 14 may be detector units and/or alarm units. For example, the units 14 may comprise one or more of smoke detectors, heat detectors, and carbon monoxide detectors. Additionally or alternatively, the units 14 may comprise an audible and/or visual device for alerting a user of an alarm condition, such as by sounding an alarm and/or flashing a light. The detection system 10 may be located in a building, and the units 14 may be distributed throughout the building. Alternatively, the detection system 10 may be located in any suitable structure such as a trailer, a container, a ship, train, truck or the like. The detection system 10 may be located in a hazardous or corrosive environment, which may contain flammable cargo or house a flammable environment, or may have high humidity (e.g. near salt-water).

The control panel 12 may communicate with the units 14 by transmitting communication signals through the control loop 16. The control panel 12 may modulate the voltage in the control loop 16 in order to communicate with the units 14. The communication signals transmitted by the control panel 14 may travel through the entirety of the control loop 16. The communication signals may be interrogation signals, for example, for requesting information from the units 14. The control panel 12 may request alarm information, unit configuration information, and/or unit health information. The alarm information may indicate whether or not the unit 14 is in an alarm condition. The alarm information may further comprise a warning level of the alarm, such as a "high", "medium", or "low" warning level indicating the severity of the alarm situation. The units 14 may therefore respond to the control panel 12 by transmitting a response signal through the control loop 16. The units 14 may modulate the current in the control loop 16 in order to respond to the control panel 12.

The communication signals transmitted by the control panel 12 may be intended for all of the units 14, or only a subset of the units 14, or only for a single one of the units 14. Each unit 14 may have a unique unit address, which may correspond to the position of the unit 14 within the control loop 16. As such, the control panel 12 may encode one or more unit addresses within the communication signals. The units 14 may be configured to decode the communication signals they receive, for example using a decoder. If the decoded address matches the unit address of the unit 14, then the unit 14 will respond to the received signal. If the decoded address does not match the unit address of the unit 14, then then the unit 14 will ignore the received signal and will not respond. The units 14 may also encode any signals they transmit with their unit address, thus allowing the control panel 12 to identify which unit 14 a received signal has originated from.

Figure 2:
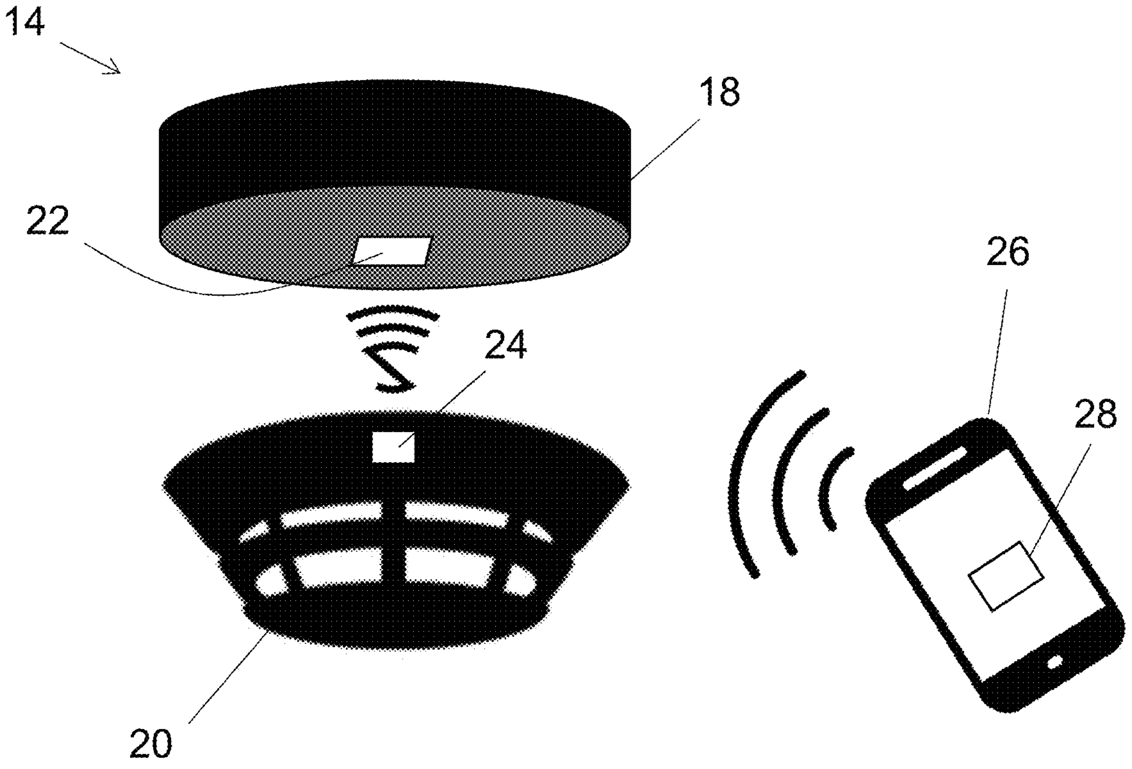
FIG. 2 is a schematic diagram of a base unit and mounting unit of the detection system of FIG. 1.

FIG. 2 shows a more detailed view of one unit 14 of the detection system 10. The unit 14 comprises a base unit 18 and a mounting unit 20. The base unit 18 may be wired to the control loop 16, and thus may remain in a fixed position within the control loop 16. For example, the base unit 18 may be hard wired to the control loop 16. The base unit 18 may be fixedly connected to a surface (such as a ceiling of the building or trailer that the detection system 10 is installed in). The mounting unit 20 may be removably connected to the base unit 18, for example through a mechanical connection. The mechanical connection may comprise nuts and bolts, a mechanical coupling, and/or may be a threaded connection. The mounting unit 20 may be removably attached to the base unit 18 in such a way that neither unit 18, 20 is damaged when the mounting unit 20 is removed from the base unit 18. As such, the mounting unit 20 may be replaceable, and may be movable around the control loop 16. The mounting unit 20 may be a detector unit and/or an alarm unit. The base unit 18 may act as a communication gateway between the control loop 16 and the mounting unit 20. As such, signals sent through the control loop 16 may pass through the base unit 18 before reaching the mounting unit 20, and vice versa.

It is typical for the mounting unit 20 to be replaced, removed, or relocated within the control loop 16. For example, a first mounting unit 20 may be coupled to a first base unit 18 with a first unit address, and a second mounting unit 20 may be coupled to a second base unit 18 with a second unit address. As such, the first mounting unit 20 may respond to any communications it receives that are encoded with the first unit address, whilst the second mounting unit 20 may respond to any communications it receives that are encoded with the second unit address. The first mounting unit 20 may perform a different function to the second mounting unit 20; for example, the first mounting unit may be a carbon monoxide detector and the second mounting unit may be a smoke detector. A user may wish to switch the positions of the first mounting unit and the second mounting unit, and thus may decouple the first mounting unit and the second mounting unit from the first base unit and the second base unit, respectively. The user may then re-couple the first mounting unit and the second mounting unit with the second base unit and the first base unit, respectively i.e. swap their positions. In this case, the mounting units 20 must know their updated unit address in order to be correctly addressed by the control panel 12. Typically, in conventional systems the mounting units 20 learn their unit address through a wired communication with the base unit 18 they are coupled to. Alternatively, a user may have to manually input the unit address into the mounting unit 20 via a mechanical switch.

However, the base unit 18 and mounting unit 20 of FIG. 2 are not electrically connected to one another. Instead, the base unit 18 comprises a first NFC module 22 and the mounting unit 20 comprises a second NFC module 24. The first NFC module 22 stores the unit address of the base unit 18. The second NFC module 24 is configured to wirelessly read the unit address from the first NFC module 22. For example, the second NFC module 24 may interrogate the first NFC module 22 for the unit address. The second NFC module 24 may then store the unit address, for example in a memory. Once the unit address is stored in the second NFC module 24, the mounting unit 20 may be able to correctly respond to communications from the control panel 12.

The first NFC module 22 may be removable from the base unit 18. That is, the first NFC module 22 may be removably connected to the base unit 18. For example, the first NFC module 22 may be attached to the base unit 20 using a removable and/or peelable adhesive. Alternatively, the first NFC module 22 may be installed within a socket of the base unit 18, similarly to a SIM card installed in a mobile telephone, or a memory card installed in a digital camera. As such, the first NFC module 22 may be removed from the base unit 18 without damaging the base unit 18. The detection system 10 may comprise a plurality of NFC modules each storing a respective unit address. The NFC modules may be manufactured en masse e.g. by perforating the NFC modules onto a sheet of adhesive material. For example, an NFC module may be manufactured for each unit address in the control loop 16. The information within the NFC modules may be encoded onto the NFC modules remotely from the system 10. The NFC modules may then be stuck by a user onto each base unit 18 connected to the control loop 16, or installed in a socket of the base unit 18 as required. As the NFC modules are removably attached to the base units 18, they may be exchanged, removed, or replaced with ease, and the system may therefore be simply configurable.

The base unit 18 may comprise a base unit housing. As shown in FIG. 2, the first NFC module 22 may be attached to the base unit housing, for example to an outer or external surface of the base unit housing. The remaining components of the base unit 18 may be housed within the base unit housing, such that they are not exposed to the surrounding environment. For example, any electrical components or contacts of the base unit 18 other than the first NFC module 22 may be physically isolated or shielded from the surrounding environment by the base unit housing. This may be advantageous for hazardous environments. For example, this may be advantageous for environments containing flammable cargo, as it is important to ensure any sparks from electrical components or contacts do not interact with the flammable material. This may also be advantageous for environments that have high humidity levels and/or are close to the sea, as exposure to the external environment in these conditions can cause electrical contacts to corrode and/or rust.

Where the first NFC module 22 is installable within a socket of the base unit 18, base unit housing may be arranged to protect the first NFC module 22 as well, or the base unit 18 may comprise a cover or flap in the base unit housing for enabling access to the socket and installation and removal of the first NFC module 22 therein.

The second NFC module 24 may be integral to the mounting unit 20. That is, the second NFC module 24 may be built into the mounting unit 20 during manufacture of the mounting unit 20. Of course, any suitable integration of the second NFC module 24 to the mounting unit 20 may be possible.

The first NFC module 22 and the second NFC module 24 are near-field communication modules, which utilise an NFC communication protocol to communicate with one another. For example, the first NFC module 22 may be a passive NFC tag, and the second NFC module 24 may be an active NFC reader/writer. When the NFC modules 22, 24 are within close proximity to one another, such as within 10 cm of one another, a communication pathway may form between the modules 22, 24. The second NFC module 24 of the mounting unit 20 may therefore be within 10 cm of first NFC module 22 of the base unit 18 when the mounting unit 20 is coupled to the base unit 18. When the second NFC module 24 is an active NFC module, it may comprise a power supply, which it may use to create a magnetic carrier field. The NFC modules 22, 24 may communicate with one another by modulating the carrier field generated by the second NFC module 24. The first NFC module 22 may not comprise a power supply, and may be powered by the magnetic field generated by the second NFC module 24. Alternatively, the first NFC module 22 may be an active NFC reader, and may comprise its own power supply. In this case, the NFC modules 22, 24 may communicate with one another by alternately generating a magnetic field.

The second NFC module 24 may be configured to read information other than the unit address from the first NFC module 22. This information may include a location of the base unit 22 e.g. relative to the structure or building, and/or configuration instructions. The configuration instructions may be instructions for configuring the mounting unit 20. For example, the mounting unit 20 may have smoke, carbon monoxide, and/or heat detecting capabilities. A user may wish for the mounting unit 20 of a given base unit 18 to disable its smoke detecting capabilities, for example if the base unit 18 is located in an environment where smoke is not a concern e.g. a kitchen. The first NFC module 22 may therefore store configuration instructions which, when executed, configure the mounting unit 20 to disable e.g. its smoke detecting capabilities. When the mounting unit 20 is coupled to the base unit 18, it may read the configuration instructions from the first NFC module 22 and may store the configuration instructions. A processor of the second NFC module 24 or the mounting unit 20 may then execute the instructions, and thus the mounting unit 20 may be configured for use in accordance with the configuration instructions.

The second NFC module 24 may be configured to write to the first NFC module 22 with information stored on the second NFC module 24. This information may include unit health information, unit configuration information, unit profile information, sensor data, and/or alarm information. The first NFC module 22 may store the information, and/or may transmit the information to the control panel 12 via the control loop 16. The second NFC module 24 may be configured to write this information to the first NFC module 22 automatically when the monitoring unit 20 is coupled to the base unit 18. Additionally or alternatively, the second NFC module 24 may be configured to write alarm information to the first NFC module 22 when the mounting unit 20 enters an alarm condition.

The first NFC module 22 may be configured to interrogate the second NFC module 24 for information. The first NFC module 22 may interrogate the second NFC module 24 through interrogation signals received from the control panel 12. This information may include unit health information, unit configuration information, unit profile information, sensor data, and/or alarm information. Hence, information may be shared in both directions between the first NFC module 22 and the second NFC module 24.

The system 10 may further comprise a mobile device 26, which may be a personal user device such as a smartphone, a tablet, a diagnostic tool, or the like. The mobile device 26 may comprise a third NFC module 28. The third NFC module 28 may be an active NFC reader. The third NFC module 28 may be configured to read information from the first NFC module 22 and/or the second NFC module 24, and may be configured to display the information to a user. This information may include the unit address, unit health information, unit configuration information, alarm information, and so on. The third NFC module 28 may be configured to write information to the first NFC module 22 and/or the second NFC module 24. For example, the third NFC module 28 may be configured to write configuration instructions to the first NFC module 22 and/or the second NFC module 24. In this way, a user may be able to wirelessly configure the unit 14. The third NFC module 28 may be used to write information onto the first NFC module 22 at a remote location from the system 10, and the first NFC module 22 may then be attached to the base unit 18.

The base unit 18 may be configured to supply power to the mounting unit 20 via the first NFC module 22 and the second NFC module 24. The base unit 18 may be powered through the control loop 16, for example by the control panel 12. The power from the control loop 16 may be transferred from the first NFC module 22 to the second NFC module 24, and then may be provided to other components of the mounting unit 20. In this way, power may be wirelessly provided to the mounting unit 20 by the base unit 18. Prior art systems 10 typically rely on electrical contacts in the base unit 18 to pass power from the base unit 18 to the mounting unit 20. The base and mounting units 18, 20 of FIG. 2 do not require any such electrical contacts, as both power and communication between the two units is achieved wirelessly through the first and second NFC modules 22, 24. Thus, the mounting unit 20 is powered wirelessly via the NFC modules, receiving all power thereby. In this way, wear and tear resulting from contact friction between the two units 18, 20 may be prevented and/or reduced. In addition, the absence of electrical contacts reduces the chances of sparks occurring within the unit, thus improving the overall safety of the system 10. Further, corrosion and other degradation of exposed contacts by the environment is avoided.

Hence, the base unit 18 and mounting unit 20 of the present invention provide a simple and reliable mechanism for both supplying power to the mounting unit 20 and configuring the mounting unit 20. In particular, the unit address can be simply assigned to the mounting unit 20 and power can be supplied to the mounting unit 20 without the need for electrical connections between the two units 18, 20. The system 10 is therefore particularly suitable for hazardous, corrosive, and/or flammable environments.

The following clauses set out features of the present disclosure which may not presently be claimed but which may form basis for future amendments and/or a continuation application and/or a continuation-in-part application.

1. A detection system for hazard detection, comprising
   a control loop;
   an addressable base unit connected to the control loop, the base unit comprising a first near-field communication module storing a unit address; and
   a mounting unit removably coupled to the base unit, the mounting unit comprising a second near-field communication module operable to read the unit address from the first near-field communication module and store the unit address so that the mounting unit is thereby addressable via the control loop.

2. A system as described in clause 1, wherein the first near-field communication module is removably attached to the rest of the base unit.

3. A system as described in clause 1, wherein the second near-field communication module is integral to the mounting unit.

4. A system as described in clause 1, wherein the second near-field communication module is operable to write to the first near-field communication module.

5. A system as described in clause 1, comprising a mobile device, the mobile device comprising a third near-field communication module operable to write to the second near-field communication module and thereby configure the mounting unit for use.

6. A system as described in clause 1, comprising a plurality of near-field communication modules each storing a different unit address, wherein at least one of the plurality of near-field communication modules is unattached to any other part of the system.

7. A system as described in clause 1, wherein the mounting unit is configured to be powered wirelessly via the second near-field communication module and the first near-field communication module of the base unit.

8. A system as described in clause 1, wherein at least one of a sensor, a processor, a memory, an audible indicator, or a visual indicator of the mounting unit is configured to be powered wirelessly via the second near-field communication module and the first near-field communication module of the base unit.

9. A system as described in clause 1, wherein the base unit does not comprise electrical terminals for contact with the mounting unit.

10. A method of operating a detection system for hazard detection, the system comprising:
    a control loop;
    an addressable base unit connected to the control loop, the base unit comprising a first near-field communication module storing a unit address; and
    a mounting unit removably coupled to the base unit, the mounting unit comprising a second near-field communication module;
    the method comprising reading the unit address from the first near-field communication module using the second near-field communication module; and
    storing the unit address in the mounting unit so that the mounting unit is thereby addressable via the control loop.

11. A method as described in clause 10, comprising selecting the first near-field communication module from a plurality of available near-field communication modules, each of the plurality of available near-field communication modules having stored therein a respective unit address.

12. A method as described in clause 10, comprising using a mobile device comprising a third near-field communication module to read the unit address from the mounting unit and/or the base unit while the mounting unit is coupled to the base unit.

13. A method as described in clause 12, comprising configuring the plurality of near-field communication modules remotely using the mobile device.

14. A method as described in clause 10, wherein the mounting unit is a first mounting unit, the method comprising uncoupling the first mounting unit from the base unit, coupling a second mounting unit comprising a respective near-field communication module to the base unit, reading the unit address from the first near-field communication module using the respective near-field communication module of the second mounting unit; and storing the unit address in the second mounting unit so that the second mounting unit is thereby addressable via the control loop.

15. A method as described in clause 10, comprising powering the mounting unit wirelessly via the first near-field communication module and the second near-field communication module.

What is claimed is:

1. A detection system for hazard detection, comprising
   a control loop;
   an addressable base unit connected to the control loop, the base unit comprising a first near-field communication module; and
   a mounting unit removably coupled to the base unit, the mounting unit comprising a second near-field communication module and configured to be powered wirelessly via the first near-field communication module of the base unit and the second near-field communication module.

2. A system as claimed in claim 1, wherein the first near-field communication module stores a unit address and the mounting unit is operable to read the unit address from the first near-field communication module and store the unit address so that the mounting unit is thereby addressable via the control loop.

3. A system as claimed in claim 1, wherein the first near-field communication module is removably attached to the rest of the base unit.

4. A system as claimed in claim 1, wherein the second near-field communication module is integral to the mounting unit.

5. A system as claimed in claim 1, wherein the second near-field communication module is operable to write to the first near-field communication module.

6. A system as claimed in claim 1, comprising a mobile device, the mobile device comprising a third near-field communication module operable to write to the second near-field communication module and thereby configure the mounting unit for use.

7. A system as claimed in claim 1, comprising a plurality of near-field communication modules each storing a different unit address, wherein at least one of the plurality of near-field communication modules is unattached to any other part of the system.

8. A system as claimed in claim 1, wherein at least one of a sensor, a processor, a memory, an audible indicator, or a visual indicator of the mounting unit is configured to be powered wirelessly via the second near-field communication module and the first near-field communication module of the base unit.

9. A system as claimed in claim 1, wherein the base unit does not comprise electrical terminals for contact with the mounting unit.

10. A method of operating a detection system for hazard detection, the system comprising:

a control loop;

an addressable base unit connected to the control loop, the base unit comprising a first near-field communication module; and a mounting unit removably coupled to the base unit, the mounting unit comprising a second near-field communication module;

the method comprising powering the mounting unit wirelessly via the first near-field communication module and the second near-field communication module.

11. A method as claimed in claim 10, wherein the first near-field communication module stores a unit address, the method comprising reading the unit address from the first near-field communication module using the second near-field communication; and storing the unit address in the mounting unit so that the mounting unit is thereby addressable via the control loop.

12. A method as claimed in claim 10, comprising selecting the first near-field communication module from a plurality of available near-field communication modules, each of the plurality of available near-field communication modules having stored therein a respective unit address.

13. A method as claimed in claim 10, comprising using a mobile device comprising a third near-field communication module to read a unit address from the mounting unit and/or the base unit while the mounting unit is coupled to the base unit.

14. A method as claimed in claim 12, comprising configuring the plurality of near-field communication modules remotely using the mobile device.

15. A method as claimed in claim 10, wherein the mounting unit is a first mounting unit, the method comprising uncoupling the first mounting unit from the base unit, coupling a second mounting unit comprising a respective near-field communication module to the base unit, reading a unit address from the first near-field communication module using the respective near-field communication module of the second mounting unit; and storing the unit address in the second mounting unit so that the second mounting unit is thereby addressable via the control loop.

* * * * *